United States Patent
Dahlmann et al.

(10) Patent No.: US 10,622,596 B2
(45) Date of Patent: *Apr. 14, 2020

(54) FEEDTHROUGH

(71) Applicant: Schott AG, Mainz (DE)

(72) Inventors: Ulf Dahlmann, Gan-Odemheim (DE); Frank Kroll, Landshut (DE); Sabine Pichler-Wilhelm, Landshut (DE); Sabrina Wimmer, Altdorf (DE); Jorg Witte, Pfungstadt (DE)

(73) Assignee: Schott AG, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/048,732

(22) Filed: Jul. 30, 2018

(65) Prior Publication Data
US 2018/0342714 A1 Nov. 29, 2018

Related U.S. Application Data

(63) Continuation of application No. 14/883,240, filed on Oct. 14, 2015, now Pat. No. 10,044,010, and a
(Continued)

(30) Foreign Application Priority Data

Apr. 15, 2013 (DE) ........................ 10 2013 006 463

(51) Int. Cl.
*H01M 2/08* (2006.01)
*H01G 11/80* (2013.01)
(Continued)

(52) U.S. Cl.
CPC .......... *H01M 2/065* (2013.01); *B23K 1/0016* (2013.01); *B23K 1/19* (2013.01); *C03C 3/062* (2013.01);
(Continued)

(58) Field of Classification Search
None
See application file for complete search history.

(56) References Cited

U.S. PATENT DOCUMENTS 2,929,727 A 3/1960 Oldfield et al.
3,240,661 A 3/1966 Babcock
(Continued)

FOREIGN PATENT DOCUMENTS

DE 1 049 063 1/1959
DE 101 05 877 A1 8/2001
(Continued)

OTHER PUBLICATIONS

International Search Report dated Jul. 28, 2014 for International Application No. PCT/EP2014/057371 (6 pages).
(Continued)

*Primary Examiner* — Jonathan Crepeau
(74) *Attorney, Agent, or Firm* — Taylor IP, P.C.

(57) ABSTRACT

An electric energy production device or an electric energy storage device including a housing and a feed-through. The feed-through includes at least one body which has at least one opening through which the at least one conductor in an electrically insulating material is fed. The insulating material has a layer structure of at least two layers wherein a top layer being arranged towards the outside of the electric energy production device or the electric energy storage device consists of a sealing glass and an inner layer one of comprises and consists of a further glass material or glass ceramic material. The electrically insulated material is bonded with at least one of the base body and the conductor, wherein the sealing glass one of includes and consists of titanium glass.

18 Claims, 3 Drawing Sheets

Related U.S. Application Data continuation of application No. PCT/EP2014/057371, filed on Apr. 11, 2014.

(51) Int. Cl.

| | |
|---|---|
| *C03C 3/04* | (2006.01) |
| *C03C 4/20* | (2006.01) |
| *H01M 2/06* | (2006.01) |
| *H01M 10/0525* | (2010.01) |
| *B23K 1/00* | (2006.01) |
| *C03C 3/062* | (2006.01) |
| *C03C 3/064* | (2006.01) |
| *C03C 3/066* | (2006.01) |
| *C03C 3/097* | (2006.01) |
| *C03C 3/19* | (2006.01) |
| *C03C 8/02* | (2006.01) |
| *C03C 8/04* | (2006.01) |
| *C03C 8/08* | (2006.01) |
| *C03C 8/24* | (2006.01) |
| *B23K 1/19* | (2006.01) |
| *B23K 103/10* | (2006.01) |
| *B23K 103/12* | (2006.01) |
| *B23K 103/14* | (2006.01) |
| *B23K 103/08* | (2006.01) |
| *B23K 103/00* | (2006.01) |

(52) U.S. Cl.
CPC .............. *C03C 3/064* (2013.01); *C03C 3/066* (2013.01); *C03C 3/097* (2013.01); *C03C 3/19* (2013.01); *C03C 4/20* (2013.01); *C03C 8/02* (2013.01); *C03C 8/04* (2013.01); *C03C 8/08* (2013.01); *C03C 8/24* (2013.01); *H01G 11/80* (2013.01); *H01M 2/08* (2013.01); *H01M 10/0525* (2013.01); *B23K 2103/10* (2018.08); *B23K 2103/12* (2018.08); *B23K 2103/14* (2018.08); *B23K 2103/15* (2018.08); *B23K 2103/52* (2018.08); *Y02E 60/13* (2013.01); *Y02T 10/7011* (2013.01); *Y02T 10/7022* (2013.01)

(56) References Cited

U.S. PATENT DOCUMENTS

| | | | |
|---|---|---|---|
| 5,965,469 | A | 10/1999 | Kilgo et al. |
| 6,037,539 | A | 3/2000 | Kilgo et al. |
| 10,044,010 | B2 * | 8/2018 | Dahlmann ........... B23K 1/0016 |
| 2014/0153165 | A1 | 6/2014 | Hettler et al. |

FOREIGN PATENT DOCUMENTS

| | | |
|---|---|---|
| DE | 10 2009 030 951 A1 | 1/2010 |
| DE | 10 2009 011 182 A1 | 9/2010 |
| DE | 10 2011 012 430 A1 | 8/2012 |
| WO | 03/061034 A1 | 7/2003 |
| WO | 2012/110242 A1 | 8/2012 |
| WO | 2012/110244 A1 | 8/2012 |
| WO | 2012110246 A1 | 8/2012 |

OTHER PUBLICATIONS

International Preliminary Report on Patentability dated Mar. 31, 2015 for International Application No. PCT/EP2014/057371 (19 pages).

"Automatisierung eines Erhitzungsmikroskops mit Hilfe digitaler Bildverarbeitung" R. Gorke, K.J. Leers: Keram.Z.48 (1996) 300-305 (5 pages).

"Schott Guide to Glass", second edition, 1995, Chapman 7 Hall, pp. 18-21 (3 pages).

Chinese Search Report for Chinese Application No. 201400214206 (2 pages).

Machine translation of DE 102011012430, Aug. 2012.

\* cited by examiner

FEEDTHROUGH

CROSS REFERENCE TO RELATED APPLICATIONS

This is a continuation of U.S. patent application Ser. No. 14/883,240 entitled "FEEDTHROUGH", filed Oct. 14, 2015, which is incorporated herein by reference.

BACKGROUND OF THE INVENTION

1. Field of the Invention

The invention relates to an energy production device or storage device having a feedthrough, in particular a battery feedthrough, for a battery such as a lithium-ion battery, a lithium ion accumulator or a capacitor, as well as to the use of sealing glass to feed a metallic conductor through and into the housing of the energy production device or storage device.

2. Description of the Related Art

Lithium-ion batteries and accumulators are provided for a multitude of applications, for example for portable electronic devices, cell phones, power tools and electric vehicles. Lithium-ion batteries, in particular for applications in the automobile industry, generally feature a multitude of individual battery cells that are connected in-series. The in-series connected battery cells are combined into so-called battery packs; several battery packs then into a battery module which is also referred to as lithium-ion battery. Each individual battery cell comprises electrodes which are led out of a housing of the battery cell. These batteries can replace conventional energy sources, for example lead-acid batteries, nickel-cadmium batteries or nickel-metal hydride batteries.

For batteries, in particular lithium-ion batteries and accumulators, light metals or light metal alloys such as aluminum alloys are often used as the housing material for the battery or as electric conductor, in particular for certain applications, especially in the automobile industry, but also for aircraft. This use in the automobile field raises a multitude of problems such as corrosion-resistance, stability in accidents or vibration resistance. An additional problem is the hermetic impermeability of the battery, in particular of the lithium-ion battery over a long period of time. The impermeability may, for example, be compromised by leakage in the area of the electrodes of the battery or respectively the electrode feed-through of the battery, by a battery short-circuit or temperature changes leading to a reduced life span of the battery. An additional problem with battery feedthroughs is the instability with respect to the aggressive battery electrolytes, especially with respect to non-aqueous electrolytes as are used for example, in lithium-ion accumulators.

In order to ensure better stability in accidents, a housing for a lithium-ion battery is suggested, for example, in DE 101 05 877 A1, whereby the housing includes a metal jacket which is open on both sides and which is being sealed. The power connection is insulated by a synthetic material. A disadvantage of synthetic material insulations is the limited temperature resistance and the uncertain impermeability over the service life.

Moreover it is known to use so-called sealing glasses or, respectively, solder glasses for metallic-electric feedthroughs that—in addition to electric insulation of the conductors—must also have a hermetic sealing function. A variety of possible design forms are described for this in the current state of the art.

U.S. Pat. Nos. 6,037,539 A and 5,965,469 A disclose a high frequency feedthrough (HF-feedthrough) wherein a ferrous or non-ferrous conductor in an aluminum-phosphate glass or alkali-aluminum-phosphate glass composition is fed through a housing component comprising aluminum. However, no battery feedthroughs are described.

WO 03/061034 A1 (EP 1 464 089 A1) moreover relates to an arrangement having a glass to metal seal for use in conjunction with a lithium-ion electrolyte, comprising a metallic body comprising a chemically stable metal, a chemically stable metallic electrically conductive pin and a glass material arranged between the metallic body and the pin, and with electric insulation of both, whereby the glass material presents a phosphate-rich composition, such as ALSG-32 glass.

DE 10 2011 012 430 A1 and WO 2012/110244 A1 describe a feedthrough having a base body, in particular in the form of preferably a disk-shaped metal part, whereby the base body has at least one opening through which at least one essentially pin-shaped conductor, embedded in a glass or glass ceramic material is guided, wherein the base body comprises a material having a low melting point, in particular a light metal, preferably aluminum or AlSiC and whereby the glass or glass ceramic material is selected so that the sealing temperature of the glass or glass ceramic material comprising the material having the low melting temperature is below the melting temperature of the base body having the low melting temperature. The glass or glass ceramic material is selected for example from the glass families of silicate-titanate, sulpho-phosphate, telluride, boride, vanadate, fluoride, phosphate or silicate.

WO 2012/110242 A1 and DE 10 2009 030 951 respectively describe a feedthrough, in particular for a lithium-ion battery whereby essentially pin-shaped conductor, embedded in a glass or glass ceramic material is guided through an opening in a base body. A glass or glass ceramic material having high phosphate content is preferably selected.

Glasses for direct sealing with metals and alloys having high thermal expansion have become known from DE 1049063 B, said glasses having a content of 4 to 30 weight-% $TiO_2$, whereby the glasses known from DE 1049063 B have an obligatory 2 to 8 weight-% SrO. SrO is advantageously used to reduce the melting temperatures and the glass transition temperature. Higher SrO content can moreover bring about an increase of the thermal coefficient of expansion. Nevertheless, SrO is an expensive raw material and using higher contents of SrO can have negative properties in regard to chemical stability of the glasses, in particular in regard to resistance to acids.

Glass systems are therefore frequently described in the current state of the art as suitable solder glasses for the cited application examples that have a high phosphate proportion, for example a phosphate proportion of >30 weight-%. These phosphate containing solder glasses are characterized, for example, in that they have a similarly high CTE (coefficient of thermal expansion) as aluminum alloys, that is in the range of 15 to $25 \times 10^{-6}$ 1/K. Based on their composition, aluminum alloys have CTE's, for example, between 20 to $26 \times 10^{-6}$ 1/K; this is however determined essentially by the main alloy components, for example Si, Mg, Cu, Mn, and Zn.

These glass systems often have at the same time a relatively low transformation temperature (Tg) that is below the melting point or melting interval of aluminum alloys.

This renders them suitable, among other factors, for the designated application. The transformation temperatures (Tg) of the solder glasses are hereby between 300 and 450° C.

Phosphate containing glasses are used as solder glasses in the current state of the art since they are very resistant to anhydrous battery electrolytes. The electrolyte consists, for example, substantially of a mixture of $LiPF_6$ and organic carbonates. A test to determine the resistance of a solder glass against an electrolyte—meaning, how much solder glass material is being dissolved by the electrolyte—is the so-called leaching. Typical leaching values are specified, for example, in WO 2012/110242 A1 in table 1 on page 19.

The production of glasses having such high phosphor content is however associated with considerable difficulties. The phosphor and/or phosphate contents can, for example, attach to the crucible or vat material during the melting process due to which the molten glass could—on the one hand—be contaminated and, on the other hand, the life span of the glass melting device could be considerably shortened. The phosphor and/or phosphate contents could furthermore easily evaporate from the molten glass, making expensive air filtration systems necessary, so that these components do not get into the environment. This increases the production costs considerably. Moreover, the filtration residue must be disposed of in an environmentally friendly manner.

Based on the described disadvantages of the current state of the art, what is needed in the art is a feedthrough of the type previously specified that can be produced with a sealing glass and which can be produced at a reduced manufacturing cost and in a more environmentally friendly manner.

SUMMARY OF THE INVENTION

According to one embodiment of the invention, a feedthrough is thus specified for a storage device such as an electric energy production device and/or an energy storage device, such as a battery feedthrough a lithium-ion battery, a lithium-ion accumulator or a capacitor comprising one base body, wherein the base body has at least one opening through which a conductor, such as a substantially pin-shaped conductor in an electrically insulated material comprising or consisting of a sealing glass is fed, wherein the base body includes or consists of a light metal and/or a light metal alloy, which can be selected from the group consisting of aluminum, magnesium, titanium, an aluminum alloy, a magnesium alloy, a titanium alloy such as Ti6246, Ti6242, Ti6Al4V and/or Ti6Al7Nb, or AlSiC, providing a material bond of the base body and/or the conductor with the sealing glass, wherein the sealing glass includes or consists of titanium glass.

According to the invention the electric feedthrough can be used in electric energy production devices and/or energy storage devices, such as lithium-ion batteries. In terms of the current invention, "battery" is understood to be a disposable battery that is disposed of and/or recycled after its discharge, as well as an accumulator.

A titanate glass can be a glass having a content of 5 weight-% titanium oxide or higher, such as 13 to 28 weight-% titanium oxide. The titanate glass can be an alkali-silicate-titanate-glass such as an alkali-silicate-titanate-glass having 13 to 28 weight-% titanium oxide, alkali content in the range of 22-52 weight-% and $SiO_2$ in the range of 24-44 weight-%.

According to the invention the sealing glass in the embodiment of a titanate glass through which the conductor is fed, can include or consist of the following components in weight-%:

| | |
|---|---|
| $B_2O_3$ | 0-<3 weight % |
| $Li_2O$ | 0-3 weight-%, such as 1-3 weight-% |
| $Al_2O_3$ | 0-2 weight-%, such as 0-<2 weight-% |
| BaO | 0-<11 weight-% |
| CaO | 0-1 weight-% |
| CuO | 0-<7 weight-% |
| $Fe_2O_3$ | 0-<5 weight-% |
| $K_2O$ | 10-27 weight-% |
| MgO | 0-<0.5 weight-% |
| $Na_2O$ | 12-22 weight-% |
| $Nb_2O_3$ | 0-0.5 weight-% |
| $P_2O_5$ | 0-3 weight-%, such as 1-3 weight-% |
| PbO | 0-<0.5 weight-% |
| $SO_3$ | 0-0.5 weight-% |
| $Sb_2O_3$ | 0-<7 weight-% |
| $SiO_2$ | 24-44 weight-% |
| $SnO_2$ | 0-<4 weight-% |
| SrO | 0-<2.5 weight-%, such as 0-<2 weight-% or 0-0.5 weight-% |
| $TiO_2$ | 5-28 weight-% |
| $V_2O_5$ | 0-13 weight-%, such as 1-13 weight-% or >5-13 weight-% |
| ZnO | 0-<0.5 weight-% |
| $ZrO_2$ | 0-1 weight-% |
| $Bi_2O_3$ | 0-19 weight-%, such as 0-18 weight-% or 0-<10 weight-%. |

According to one embodiment of the invention, the BaO content in the titanate glass is in the range of 0-4 weight-%, such as 0-<0.5 weight-%. Example upper limits of BaO (always in weight-%–oxide basis) are also 3.5%, 3.0%, 2.5%, 2.0%, 1.5%, 1.0% and/or 0.5%. These can be combined with the lower limit of 0 weight-%.

According to another embodiment of the invention, the CuO content in titanate glass is in the range of 0-<6 weight-%, such as 0-<0.5 weight-%. Example upper limits of CuO are (always in weight-%–oxide basis) also 5.5%, 5.0%, 4.5%, 4.0%, 3.5%, 3.0%, 2.5%, 2.0%, 1.5%, 1.0% and/or 0.5%. These can be combined with the lower limit of 0 weight-%.

According to another embodiment of the invention, the $Fe_2O_3$ content in the titanate glass is in the range of 0-<0.5 weight-%. Example upper limits of $Fe_2O_3$ (always in weight-%–oxide basis) are also 0.4%, 0.3%, 0.2% and/or 0.1%. These can be combined with the lower limit of 0 weight-%.

According to another embodiment of the invention, the $K_2O$ content in the titanate glass is in the range of 10-20 weight-%, such as 10-14 weight-%. Example upper limits of $K_2O$ (always in weight-%–oxide basis) are also 19%, 18%, 17%, 16%, 15%, 14%, 13%, 12% and/or 11%. These can be combined with the lower limit of 10 weight-%.

According to another embodiment of the invention, the $Na_2O$ content in the titanate glass is in the range of 12-20 weight-%, such as 12-18 weight-%. Example upper limits of $Na_2O$ (always in weight-%–oxide basis) are also 19%, 18%, 17%, 16%, 15%, 14% and/or 13%. These can be combined with the lower limit of 12 weight-%.

According to another embodiment of the invention, the $Sb_2O_3$ content in the titanate glass is in the range of 0-<0.5 weight-%, such as 0 weight-%. Example upper limits of $Sb_2O_3$ (always in weight-%–oxide basis) are also 0.4%, 0.3%, 0.2% and/or 0.1%. These can be combined with the lower limit of 0 weight-%.

According to another embodiment of the invention, the $SnO_2$ content in the titanate glass is in the range of 0-<0.5 weight-%, such as 0 weight-%. Example upper limits of $SnO_2$ (always in weight-%–oxide basis) are also 0.4%, 0.3%, 0.2% and/or 0.1%. These can be of course combined with the lower limit of 0 weight-%.

According to another embodiment of the invention, the $SiO_2$ content in the titanate glass is in the range of 28-37 weight-%, such as 29-34 weight-%. Example upper limits of $SiO_2$ (always in weight-%–oxide basis) are also 36%, 35%, 34%, 33%, 32%, 31%, 30% and/or 29%. These can be combined with the lower limit of 28 weight-%.

According to another embodiment of the invention, the $TiO_2$ content in the titanate glass is in the range of 13-28 weight-%, such as 20-25 weight-%. Example upper limits of $TiO_2$ (always in weight-%–oxide basis) are also 27%, 26%, 25%, 24%, 23%, 22%, 21%, 20%, 19%, 18%, 17%, 16%, 15% and/or 14%. These can be combined with the lower limit of 13 weight-%, but also with the lower limit of 20 weight-% for upper limits of >20 weight-%.

According to another embodiment of the invention, the $V_2O_5$ content in the titanate glass is in the range of 2-12 weight-%, such as 2-10 weight-% or >5 to 13 weight-%. Example upper limits of $V_2O_5$ (always in weight-%–oxide basis) are also 12%, 11%, 10%, 9%, 8%, 7%, 6%, 5%, 4%, and/or 3%. These can be combined with the lower limit of 2 weight-%, but also with the lower limit of >5 weight-% for upper limits of >5 weight-%.

According to another embodiment of the invention, the $ZrO_2$ content in the titanate glass is in the range of 0-<0.5 weight-%, such as 0 weight-%. Example upper limits of $ZrO_2$ (always in weight-%–oxide basis) are also 0.4%, 0.3%, 0.2% and/or 0.1%. These can be combined with the lower limit of 0 weight-%.

According to another embodiment of the invention, the inventive sealing glass in the embodiment of the titanate glass—except for contaminants—is free of PbO and/or $SO_3$ and/or BaO and/or CuO and/or ZnO.

All of these embodiments can be combined with each other, as desired. Random combinations of one, several or all of these embodiments with components of the general inventive range are also possible. It is therefore possible with each respective embodiment that the content of the following components is selected independent from one another or in any desired combination, as follows: $Al_2O_3$ from 0-<2 weight-%, SrO from 0-<2 weight-%, $V_2O_5$ from >5-13 weight-%, $BiO_3$ from 0-18 weight-%.

Example upper limits of $Al_2O_3$ (always in weight-%–oxide basis) are also 1.9%, 1.8%, 1.7%, 1.6%, 1.5%, 1.4%, 1.3%, 1.2%, 1.1%, 1.0%, 0.9%, 0.8%, 0.7%, 0.6%, 0.5%, 0.4%, 0.3%, 0.2% and/or 0.1%. These can be combined with the lower limit of 0 weight-%.

Example upper limits of SrO (always in weight-%–oxide basis) are also 1.9%, 1.8%, 1.7%, 1.6%, 1.5%, 1.4%, 1.3%, 1.2%, 1.1%, 1.0%, 0.9%, 0.8%, 0.7%, 0.6%, 0.5%, 0.4%, 0.3%, and/or 0.2%. These can be combined with the lower limit of 0 weight-%.

In spite of the reduction of the SrO content, the inventors were able to provide a sealing glass, suitable for the application. The conflict of the objective was hereby solved—that SrO improves the meltability and the flow of the glass, as well as causes an increase in thermal coefficient of expansion which is desirable, in particular, for joining with light metals, for example aluminum, which reduces the chemical stability, in particular acid resistance. Because of the inventive composition ranges of the titanate glass it is possible to provide a suitable glass which has the advantage of greater stability in regard to electrolytes as occur, for example, in energy storage applications, such as battery or capacitor applications.

The titanate glass according to the invention can be free of SrO. However, it is sometimes not avoidable or, in regard to the effort, justifiable to completely avoid contamination with this component due to the natural distribution of this substance in the desired components or due to processing during glass production. Therefore, small amounts of SrO may also be present in this embodiment in the inventive joining material due to these contaminations. However, the total SrO content can be tailored to not exceed 0.2 weight-%.

According to an additional embodiment, the sealing glass in the form of a titanate glass through which the conductor is fed, includes or consists of the following components in weight-%:

| | |
|---|---|
| $B_2O_3$ | 0-<3 |
| $Li_2O$ | 1-3 |
| $Al_2O_3$ | 0-2 |
| BaO | 0-4 |
| CaO | 0-1 |
| CuO | 0-<6 |
| $Fe_2O_3$ | 0-<0.5 |
| $K_2O$ | 10-20 |
| MgO | 0-<0.5 |
| $Na_2O$ | 12-20 |
| $Nb_2O_3$ | 0-<0.5 |
| $P_2O5$ | 1-3 |
| PbO | 0-<0.5 |
| $SO_3$ | 0-<0.5 |
| $Sb_2O_3$ | 0-<0.5 |
| $SiO_2$ | 28-37 |
| $SnO_2$ | 0-<0.5 |
| SrO | 0-<2.5 |
| $TiO_2$ | 13-28 |
| $V_2O_5$ | >5-10 |
| ZnO | 0-<0.5 |
| $ZrO_2$ | 0-<0.5 |
| $Bi_2O_3$ | 0-18. |

The specified sealing glasses are stable alkali-silicate-titanate compositions that have a lower phosphate content than alkali-phosphate glasses that are known from the current state of the art.

Surprisingly, it has been shown that the sealing glasses used according to the invention represent an alternative to the known phosphate glasses, whereby these display a greater chemical stability compared to some phosphate glasses.

According to the invention, light metals or light metal alloys can be used for the base body. Light metals are metals having a specific weight of less than 5.0 kg/dm³. The specific weight of the light metals can be in the range of 1.0 kg/dm³ to 3.0 kg/dm³. Generally, light metals are metals having a low melting point, having melting temperatures in the range of 350° C. to 800° C. They are, for example, aluminum, magnesium or titanium; light metal alloys are, for example, aluminum alloys, magnesium alloys or titanium alloys such as Ti6246, Ti6242, Ti6Al4V and/or Ti6Al7Nb. AlSiC can also be used. AlSiC represents a matrix that is infiltrated with, or diffused by Al. Due to the share of Al, the properties such as the coefficient of expansion can, in particular, be adjusted. AlSiC has, in particular, a lower thermal expansion than pure aluminum. For simplification, AlSiC is herein specified under the light metal alloys.

Aluminum or aluminum alloys having a melting point or, respectively, a melting temperature in the range of 350° C. to 700° C., an electric conductivity in the range of $10 \cdot 10^6$ S/m to $40 \cdot 10^6$ S/m, a coefficient of expansion in the range of $18 \times 10^{-6}$ to $26 \times 10^{-6}$/K, as well as a specific weight in the range of 2.5 kg/dm³ to 2.9 kg/dm³ can be understood under the previously specified definition of a light metal or a light metal alloy.

The at least one conductor, such as the substantially pin-shaped conductor can also include a light metal or a light metal alloy. The light metals or light metal alloys used for the conductor excel in an electric conductivity in the range of $5 \cdot 10^6$ Sm$^{-1}$ to $50 \cdot 10^6$ Sm$^{-1}$.

Alternatively hereto the conductor, such as the substantially pin-shaped conductor, can include or consist of copper or CuSiC or a copper alloy, gold or gold alloys, silver or silver alloys, NiFe, an NiFe-casing having a copper core as well as a cobalt-iron alloy.

Aluminums or respectively aluminum alloys that can be used for the conductor are:
EN AW-1050 A
EN AW-1350
EN AW-2014
EN AW-3003
EN AW-3005
EN AW-4032
EN AW-5019
EN AW-5056
EN AW-5083
EN AW-5556A
EN AW-6060
EN AW-6061
EN AW-6082
EN AW-7020.

Copper or respectively copper alloys that can be used for the conductor are:
Cu-PHC 2.0070
Cu-OF 2.0070
Cu-ETP 2.0065
Cu-HCP 2.0070
Cu-DHP 2.0090.

Aluminum or an aluminum alloy can be used for the base body and the electric conductor.

The material of the conductor, such as the pin-shaped conductor, can be identical to the material of the base body and a light metal such as aluminum or a light metal alloy, such as an aluminum alloy. This allows the coefficient of expansion of the base body and metal pin to be identical. The linear thermal coefficient of expansion α of the utilized sealing glass then only has to be adapted to one material. In this case $\alpha_{sealing\ glass}$ is approximately equal to $\alpha_{base\ body}$ and/or $\alpha_{metal\ pin}$ in to produce a so-called adapted feedthrough. With adapted feedthroughs, no tension occurs between the insulator, such as the sealing glass, and the base body or, respectively, the metal pin during temperature changes due to the substantially same coefficient of expansion of the materials. Such a characteristic can be useful. In any case, a material bond occurs between the sealing glass and the base body and/or the metal pin.

If a pressure glass feedthrough is to be provided, $\alpha_{sealing\ glass}$ is generally smaller than $\alpha_{base\ body}$ and approximately equally as great as $\alpha_{metal\ pin}$. In the instance where the base body and the metal pin are of a different material $\alpha_{base\ body} \geq \alpha_{sealing\ glass} \approx \alpha_{metal\ pin}$ applies, for example. The different coefficients of expansion of the materials then allow a pressure seal, wherein again a material bond occurs between sealing glass and the surrounding materials, such as the light metal.

In the context of the current invention, "material bond" is understood to be a connection wherein the sealing glass and the connecting partner—in this case the base body or the metal pin or both—are held together by a bond on the basis of atomic or molecular forces. This provides a permanent connection that can only be separated by destruction of the bonding material.

According to the invention, sealing glasses are therefore provided that are suitable to engage in a material bond with appropriate materials, selected from metals, which can be light metals such as aluminum, pure aluminum, magnesium or titanium or light metal alloys, such as aluminum alloys, magnesium alloys or titanium alloys. In this context, it must be considered that not all desired glass composition are suitable to meet the requirements according to the invention, for example, for use in a lithium-ion battery.

In order to achieve a melting temperature in the inventively used sealing glasses that is as low as possible and which is compatible with the melting temperatures and/or the deformation of the light metal, a high lead-oxide content could, for example, be used. However, due to the toxicity, the current trend is to use lead-free systems, so that the low melting temperature must be reached by addition other additives. For example, a desired low melting temperature can be achieved through the addition of $Li_2O$ and/or BaO and/or $V_2O_5$ and/or $Bi_2O_3$. Titanate glasses can be used which have a $V_2O_5$ content in the range of >5 to 13 weight-% and/or a $Bi_2O_3$ content of between 0 and 18 weight-%, such as 0-19 weight-%, or 0 to <10 weight-%.

It is generally more difficult to produce a material bonding of sealing glass and more highly alloyed aluminum alloys than with pure aluminum (at least 99% aluminum) or lower alloyed aluminum.

Magnesium is an often used alloying element with aluminum since it has a very positive influence on the solidity of the alloy. Even magnesium contents of >0.5 weight-% have, however, proven to be unfavorable in regard to the bond of the sealing glass. Many times other alloy elements are also troublesome in regard to the adherence of the sealing glass on the surface.

As is known with aluminum, the mechanical properties change greatly with small additions of alloying elements such as magnesium, silicon, copper, zinc, nickel, iron, chromium, manganese and others when compared with pure aluminum.

In order to realize compression glass to metal sealing, it can be useful to utilize aluminum alloys that, after the sealing process which normally occurs at temperatures of 480° C. to 600° C., still have adequate strength.

The following aluminum alloys can therefore be utilized:
EN AW-1050 A
EN AW-1350
EN AW-3003
EN AW-3004
EN AW-3005
EN AW-4032
EN AW-5083
EN AW-6060
EN AW-6061
EN AW-6082
EN AW-7020.

When producing a material bond between sealing glass and these aluminum alloys, an especially strong adhesive bond occurs in the current invention. This manufacturing process is also reliable and simple to implement.

Various adhesion mechanisms between sealing glass and aluminum alloys are assumed that cause the material bond. However, no universally accepted mechanism is described in available literature. It can be assumed that the mechanical tension difference due to different thermal expansion of sealing glass and aluminum is compensated for through plastic flow of aluminum during cooling and prevents spalling of the sealing glass.

To improve the bond between sealing glass and light metal and/or the light metal alloy—which can be aluminum and/or aluminum alloys—one or several pre-treatment processes and/or coatings (conversion layers) can be implemented. According to the invention, a surface treatment of the light metal or light metal alloy, which can be aluminum and/or an aluminum alloy, is performed, such as a chromate treatment that prevents the formation of magnesium-rich surface layers. Conversion layers on the basis of titanium oxide, silicate, zirconium oxide or phosphate can likewise improve the adhesion between aluminum and sealing glass.

According to the invention, especially when using light metal or light metal alloys such as aluminum or aluminum alloys and after a possibly performed pre-treatment of the surface, a material bond between the used sealing glass and the light metal such as aluminum and/or light metal alloy, such as an aluminum alloy, is achieved. In addition to the mechanic resilience, for example, in regard to pushing out of the opening in the base body, this material bond supports the hermetic impermeability of the feedthrough.

The specified sealing glasses excel in high thermal expansions $\alpha$ (CTE) in the range of 20° C. to 350° C. which are in the range of $25 \cdot 10^{-6}$/K and fall thus within the range of thermal expansion of light metals and light metal alloys such as aluminum and aluminum alloys. At room temperature aluminum has a thermal expansion $\alpha$ of $23 \times 10^{-6}$/K.

Based on the described characteristics, the sealing glasses according to the invention are suitable for joining with temperature sensitive materials and/or components in the embodiment of electric feedthroughs. The softening point (Tg) of the inventively used sealing glasses is hereby typically in the range of 300 to 500° C.

In order to prevent that during the production of the bond the light metal/light metal alloy of the base body and, if light metal/light metal alloy is also used for the metal pin melts or is deformed, the processing temperature of the sealing glass during the production of the material bond with the material of the base body and/or conductor is below the melting temperature of the material of the base body or, respectively, the conductor. An indicator for this processing temperature is the transformation temperature Tg.

Sealing glasses that were used in the current example are generally produced from powder that is melted and pressed into a formed body and through heat exposure result in the material bond between the components that are to be connected with each other.

The invention moreover provides a method to produce a feedthrough with at least one conductor, whereby the method includes the following steps:

Provision of a conductor, such as a substantially pin-shaped conductor, and a base body, wherein the base body includes or consists of a light metal and/or a light metal alloy, which can be aluminum, magnesium, titanium, an aluminum alloy, a magnesium alloy, a titanium alloy such as Ti6246, Ti6242, Ti6Al4V and/or Ti6Al7Nb, or AlSiC;

provision of a sealing glass that includes or consists of a titanate glass, grinding and granulating of the sealing glass and production therefrom of a molded body that has a suitable opening for the conductor;

optional heat treatment of the obtained molded body, possibly by adding a binding agent;

assembly of the components to a feedthrough;

heat treatment to create a material bond between base body and/or the substantially pin-shaped conductor and the sealing glass.

When producing an electric feedthrough according to the current invention, for example for a lithium-ion battery, the process is in particular as follows:

The base body and the conductor, such as the substantially pin-shaped conductor, are provided in the desired material. The base body includes or consists of a light metal and/or a light metal alloy, which can be aluminum, magnesium, titanium, an aluminum alloy, a magnesium alloy, a titanium alloy such as Ti6246, Ti6242, Ti6Al4V and/or Ti6Al7Nb, or AlSiC. The conductor, in particular the substantially pin-shaped conductor, includes or consists of a light metal and/or a light metal alloy, which can be aluminum, magnesium, titanium, an aluminum alloy, a magnesium alloy, a titanium alloy or AlSiC.

Alternatively the conductor, such as the substantially pin-shaped conductor can include or consist of copper or CuSiC or a copper alloy, gold or gold alloys, silver or silver alloys, NiFe, an NiFe-casing having a copper core as well as a cobalt-iron alloy.

As previously described, the base body and the conductor may consist of the same material or may be selected from various materials.

Moreover, in the current invention the sealing glass that includes a titanate glass or consists thereof is provided, manufactured or acquired. The provided sealing glass is ground and granulated and then pressed mechanically or hydraulically (isostatic or uniaxial) into a molded body. It can be useful to subject the molded body to a heat treatment (sintering), thus increasing the "green strength" of the molded body. The temperatures are in the range of approximately 300° C. to 450° C. It can also be useful to mix the powder prior to the pressing procedure with an organic binding agent in order to improve the compressibility. Alcohols can, for example, be used as organic binding agents.

According to one embodiment, the formed body can have a cylindrical shape. In this embodiment a cylindrical opening for contacting is already contained in axial direction of the formed body.

After appropriate optional pre-treatment, such as surface treatment of the base body and/or pin-shaped conductor, for example degreasing and/or removal of a surface-adhering oxide layer (chemically and/or mechanically) the assembly of the components for the electric feedthrough is performed. Subsequently a heat treatment is performed, wherein the material bond occurs between sealing glass and metal parts. A temperature in the range of 400° C. to 600° C. can be used during heat treatment. With aluminum or an aluminum alloy an upper limit of 650° C. should not be exceeded.

According to the invention it is possible to pre-manufacture the feedthrough, in other words to embed the pin material by a material bond into the base body by using the formed sealing glass body and to subsequently install it into a housing component, such as a battery cell. This can signify a simplification and improvement in the efficiency of the manufacturing process, wherein a cost-effective insertion of the feedthrough into the opening of the housing component can occur.

Alternatively, the conductor can also be embedded directly into the opening of the housing component of a battery together with the formed sealing glass body and by creating a material bond.

The base body can be a ring-shaped body, in a circular shape or an oval shape. The oval shape can be useful when the housing component, in particular the cover part of the battery cell into whose opening(s) the feedthrough is inserted, has a narrow elongated shape and the sealing glass material with which the pin-shaped conductor is fed through the housing component in the opening is inserted completely between the base body and the pin-shaped conductor. This type of design enables the feedthrough, consisting of a substantially pin-shaped conductor and a substantially ring-shaped base body to be pre-manufactured.

The battery feedthrough according to the invention is characterized not only in that a hermetic seal and material bond with a base body having a low melting temperature is possible, but also in that sufficient stability in regard to a battery electrolyte and external environmental influences is provided.

The invention provides, in particular, a sufficient chemical stability in regard to non-aqueous, generally aggressive battery electrolytes. Non-aqueous battery electrolytes consist typically of a carbonate, in particular of a carbonate mixture, for example a mixture of ethylene carbonate or dimethyl carbonate, whereby the aggressive non-aqueous battery electrolytes include a conducting salt, for example $LiPF_6$, for example, in the form of a molar solution. In addition to a high thermal coefficient of expansion in the range of $\alpha$ (20° C.-350° C.) to $25 \cdot 10^{-6}$/K and the low sealing temperature or respectively hemispherical temperature, according to the invention the specified sealing glasses also have sufficient stability in regard to the aforementioned battery electrolytes. The sealing temperature may, for example, be determined through the hemispherical temperature as described in R. Görke, K. J. Leers: Keram. Z. 48 (1996) 300-305, or according to DIN 51730, ISO 540 or CEN/TS 15404 and 15370-1 whose disclosure content is incorporated by reference herein. The measurement of the hemispherical temperature is described in detail in DE 10 2009 011 182 A1 whose disclosure content is incorporated by reference herein.

In another embodiment, the sealing glass for the battery feedthrough includes Li that is integral in the sealing glass structure. Since the electrolyte—as used for Li-ion-storage devices—also contains Li, the battery efficiency is not impaired through this measure.

The sealing glasses according to the invention in the form of titanate glasses excel therefore in regard to their chemical stability, so that in addition to the adjustment of the CTE the stability in regard to the battery electrolyte an the aqueous stability in regard to humidity are at the same time improved.

Two tests are used, essentially, to determine the chemical stability. In a first test the possible development of gas as a reaction between electrolyte and sealing glass is evaluated. A second test examines how much material of the sealing glass is dissolved by the electrolyte (so-called leaching).

The stability of the inventive composition in regard to the battery electrolytes can be checked by grinding the composition in the form of a powder to a granulation of 50-10 μm and to deposit it for a predetermined period of time, for example one week in the electrolytes. A carbonate mixture consisting of ethylene carbonate and dimethyl carbonate (mass ratio 1:1) with an addition of $LiPF_6$ as the conducting salt (1 molar solution) is used, for example, as the non-aqueous electrolyte. After the powder has been exposed to the electrolyte, the powder can be filtered out and the electrolyte can be checked for parts that were leached out of the sealing glass (so-called leaching).

During testing of the inventively used sealing glasses, no gas development was observed. Moreover it turned out that with the sealing glasses in the composition according to the invention only very low leaching occurred. Mass losses occur that are less than 11 weight-% of the sealing glass. In some cases leaching of only 1.5 weight-% of sealing glass occurs.

In addition, it turned out that the stability of the sealing glasses according to the invention relative to Li- and F-containing electrolytes is higher than with phosphate glasses. Moreover it was observed that also the stability of the inventive sealing glasses is sufficient in the aqueous electrolyte.

An additional advantage of the inventive sealing glasses that are used in a battery feedthrough with one or several pins, in particular having base bodies consisting of light metal and/or light metal alloy, such as aluminum or aluminum alloy, can be found in that sealing of the sealing glass with the light metal/light metal alloy of the base body and/or the metal of the conductor, such as in the embodiment of a metal pin, is also possible in a gas atmosphere. A vacuum is thus not necessary. In fact, such fusing can also take place in air. Protective glass can be used optionally. As a pre-treatment to fusing, the metal can be cleaned and/or etched (stained), and, if necessary, specifically oxidized or coated.

The specified sealing glass compositions at the same time offer high chemical stability relative to non-aqueous electrolytes, as well as a high thermal coefficient of expansion. This is surprising, in particular, because it is assumed that, the higher the thermal coefficient of expansion, the instability of the underlying material increases as a rule. It is therefore surprising that, in spite of the low processing temperature, the specified sealing glasses have sufficient chemical stability.

The current invention thus provides a feedthrough, such as a battery feedthrough, that compared to feedthroughs from the current state of the art—for example those having plastic as sealing material—excels through high temperature resistance, in particular to temperature change resistance. Moreover, hermetic sealing is provided also during temperature changes, preventing that fluid, such as battery fluid, can leak and/or that moisture can penetrate into the housing. Moreover, the impermeability and durability of the bond remains, also due to the high resistance to moisture. On this basis the feedthrough according to the current invention is also resistant to failure, for example, if the battery overheats during use in appropriate applications due to damage or malfunction.

In the context of the current invention "hermetic seal" is to be understood that, at a pressure difference of 1 bar, the helium leakage rate is $<1 \cdot 10^{-8}$ mbar L s$^{-1}$, such as $<1 \cdot 10^{-9}$ mbar L s$^{-1}$.

The electrically insulating material through which the conductor, such as the substantially pin-shaped conductor, is fed consists of, or includes the inventive sealing glass. If this material consists of sealing glass, then no other material is present, only one layer of the inventive titanate glass. If the electrically insulating material includes sealing glass, then it includes at least one other material in addition to the sealing glass composition, such as one selected from a glass or glass ceramic composition. The electrically insulating material can consist completely of a glass material which, in addition to the inventive sealing glass can contain an additional glass, material or additional glass materials.

In another embodiment of the invention, the electrically insulating material through which the conductor is led can include a layer structure including or consisting of multiple layers, for example 2 layers or 3 layers or more, whereby at least the top layer or cover layer that is arranged toward the outside of the storage device, for example a battery, includes or consists of the inventive sealing glass in form of a titanate glass.

A layer structure consisting of at least 3 layers is also conceivable, wherein the top and/or bottom layer includes or consists of the inventively used sealing glass. A sandwich structure can be used, wherein the top and bottom layer includes or consists of a sealing glass, selected from the specified composition range. The sealing glass in both layers (top and bottom layer) may be of the same or of a different composition. The other layers in the layered structure are not further limited, provided they have no adverse effects. One layer in the layered structure may, for example, consist of phosphate glass. The phosphate glass may, for example, include or consist of the following components in mol-%.

| | |
|---|---|
| $P_2O_5$ | 35-50 mol-%, such as 39-48 mol-% |
| $Al_2O_3$ | 0-14 mol-%, such as 2-12 mol-% |
| $B_2O_3$ | 2-10 mol-%, such as 4-8 mol-% |
| $Na_2O$ | 0-30 mol-%, such as 0-20 mol-% |
| $M_2O$ | 0-20 mol-%, such as 12-20 mol-%, whereby M can be K, Cs, or Rb |
| PbO | 0-10 mol-%, such as 0-9 mol-% |
| $Li_2O$ | 0-45 mol-%, such as 0-40 mol-%, or 17-40 mol-% |
| BaO | 0-20 mol-%, such as 0-20 mol-%, or 5-20 mol-% |
| $Bi_2O_3$ | 0-10 mol-%, such as 1-5 mol-%, or 2-5 mol-%. |

Therefore, a layer structure consisting of 3 layers ("sandwich") can be useful, wherein the top and/or bottom layer always include or consist of a sealing glass and the inner layer includes or consists of a phosphate glass, such as the previously specified phosphate glass. In this three-layer system, the material bond of the sealing glass is established according to the invention, in particular between base body and conductor, such as the substantially pin-shaped conductor.

In the context of the current invention, regardless of the orientation of the feedthrough in the storage device, the "top layer" is understood to be the layer in the layer structure that is in contact with the outside environment and protects the underlying layers therefrom. The "bottom layer" in the layer structure is therefore the layer positioned furthest from the top layer that protects the layers above it from the materials in the interior of the storage device.

If a layer structure comprising titanate glass includes additional glass or glass ceramic material, the coefficient of expansion of the glass or glass ceramic material can be coordinated to a large extent with the coefficient of expansion of the sealing glass.

The sealing glass layer can have a thickness of 1 to 10 mm, such as 4 to 9 mm or 5 to 7 mm and a diameter of up to 20 mm. In a layer construction, additional layers of other materials, such as glass or glass ceramic having variable thicknesses are then added.

In another embodiment of the invention, as an alternative to the previously described layer construction—for the case that the base body and the metal pin comprise of different materials—a structure is also possible, wherein a first glass or glass ceramic material having a first coefficient of expansion $\alpha_1$ and a second glass or glass ceramic material having a second coefficient of expansion $\alpha_2$ are used, wherein the coefficient of expansion $\alpha_1$ of the first glass or glass ceramic material is adapted to the coefficient of expansion of the material of the base body and coefficient of expansion $\alpha_2$ is adapted to the coefficient of expansion of the material of the conductor, in particular the substantially pin-shaped conductor. The glass components, consisting of several different glasses can for example be produced as formed glass parts consisting of several glass materials. According to the invention this is also referred to as multicomponent glass. According to the invention, a bottom (which can be arranged immediately underneath the multicomponent glass) and/or top layer or cover layer (which can be arranged immediately above or on the multicomponent glass) are hereby again provided which include or consist of sealing glass. The bottom and/or top layer between which the multicomponent glass is arranged can include or consist of the sealing glass according to the invention.

The first metal can be a light metal, for example aluminum, and the first glass material can be selected so that the coefficient of expansion $\alpha_1$ is adapted to the coefficient of expansion of the light metal, such as aluminum (approximately $\alpha = 23 \times 10^{-6}$ $K^{-1}$ at 20° C.). The values for coefficient of expansion $\alpha_1$ can be in the range $(16 \text{ to } 25) \times 10^{-6}$ $K^{-1}$ within temperature range 20° C. to 300° C.

Glass materials having such coefficient of expansion that are considered can be those selected from the following glass families: silicate-titanate, sulpho-phosphate, telluride, borate, vanadate, phosphate and silicate. For expansion adaptation, or in other words for adaptation of the coefficient of expansion, these glass materials can be provided with fillers. The addition of alkali or earth alkali to the glasses for adjustment of the coefficient of expansion is also possible.

If the pin-shaped conductor consists of copper or a copper alloy having a coefficient of expansion of approximately $\alpha = 16 \times 10^{-6}$ $K^{-1}$ at 20° C., the second glass material can be selected so that the coefficient of expansion $\alpha_2$ is within the range of the coefficient of expansion of the metal pin, for example between 12 and $18 \times 10^{-6}$ $K^{-1}$ at 20° C.

Glass or glass ceramic materials that provide such a coefficient of expansion are, for example, the following glass families: silicate-titanate, sulpho-phosphate, telluride, borate, vanadate, phosphate and silicate. Additives, in particular alkali or earth alkali can be provided also with these glasses for adaption of expansion.

According to another embodiment of the invention, the electrically insulating material through which the at least one conductor, such as the substantially pin-shaped conductor is fed and that includes the at least one first glass or glass ceramic material and a second glass or glass ceramic material and a top and/or a bottom layer, comprising or consisting of sealing glass is a multicomponent glass, such as a glass pellet.

The invention can also be an electric storage device, such as a battery, a lithium-ion battery or lithium-ion accumulator or capacitor having a feedthrough according to the current invention.

The housing of the battery can consist of the same material as the base body, such as a light metal and/or a light metal alloy. With battery cells, the base body can be part of the battery housing. The battery can be a lithium-ion battery.

In one embodiment, the pin-shaped conductor comprises, additionally, a head part or respectively a mounting device. The head part may include an extension protruding beyond the head part. The extension can serve to provide centering for electrodes or electrode connecting parts. In the embodiment having the head part, electrode connecting parts or the battery electrodes can be connected to the head part that extends into the interior of the battery cell housing as described in WO 2012/110242 A2 and WO 2012/110246, the disclosure content of which is herewith incorporated by reference.

The battery can have a non-aqueous electrolyte, such as on carbonate basis, which can be a carbonate mixture. The carbonate mixture can include an ethylene carbonate in mixture with dimethyl carbonate with a conducting salt, for example $LiPF_6$.

The invention also relates to capacitors in which the inventive feedthrough is used.

According to an additional aspect, the invention moreover provides the use of sealing glass in the form of titanate glass for the feedthrough of a conductor into the housing of a storage device, such as a battery or a lithium-ion battery, a lithium accumulator or a capacitor by hermetically sealing and electrically insulating the feedthrough and forming a material bond between a base body and/or a conductor with the sealing glass.

The inventively used sealing glass in the form of titanate glass includes or consists of the following components specified in weight-%:

| | |
|---|---|
| $B_2O_3$ | 0-<3 weight-% |
| $Li_2O$ | 0-3 weight-%, such as 1-3 weight-% |
| $Al_2O_3$ | 0-<2 weight-%, such as-<2 weight-% |
| BaO | 0-<11 weight-% |
| CaO | 0-1 weight-% |
| CuO | 0-<7 weight-% |
| $Fe_2O_3$ | 0-<5 weight-% |
| $K_2O$ | 10-27 weight-% |
| MgO | 0-<0.5 weight-% |
| $Na_2O$ | 12-22 weight-% |
| $Nb_2O_3$ | 0-<0.5 weight-% |
| $P_2O_5$ | 0-3 weight-%, such as 1-3 weight-% |
| PbO | 0-<0.5 weight-% |
| $SO_3$ | 0-<0.5 weight-% |
| $Sb_2O_3$ | 0-<7 weight-% |
| $SiO_2$ | 24-44 weight-% |
| $SnO_2$ | 0-<4 weight-% |
| SrO | 0-<2.5 weight-%, such as 0-<2 weight-% or 0-0.5 weight-% |
| $TiO_2$ | 5-28 weight-% |
| $V_2O_5$ | 0-13 weight-%, such as 1-13 weight-% or >5-13 weight-% |
| ZnO | 0-<0.5 weight-% |
| $ZrO_2$ | 0-1 weight-% |
| $Bi_2O_3$ | 0-19 weight-%, such as 0-18 weight-% or 0-<10 weight-%. |

The used sealing glass can also comprise or consist of the following components in weight-%:

| | |
|---|---|
| $B_2O_3$ | 0-<3 |
| $Li_2O$ | 1-3 |
| $Al_2O_3$ | 0-<2 |
| BaO | 0-4 |
| CaO | 0-1 |
| CuO | 0-<6 |
| $Fe_2O_3$ | 0-<0.5 |
| $K_2O$ | 10-20 |
| MgO | 0-<0.5 |
| $Na_2O$ | 12-20 |
| $Nb_2O_3$ | 0-<0.5 |
| $P_2O_5$ | 1-3 |
| PbO | 0-<0.5 |
| $SO_3$ | 0-<0.5 |
| $Sb_2O_3$ | 0-<0.5 |
| $SiO_2$ | 28-37 |
| $SnO_2$ | 0-<0.5 |
| SrO | 0-<2.5 |
| $TiO_2$ | 13-28 |
| $V_2O_5$ | >5-10 |
| ZnO | 0-<0.5 |
| $ZrO_2$ | 0-<0.5 |
| $Bi_2O_3$ | 0-18. |

In one arrangement, the usually pin-shaped inside metallic conductor of the storage device comprises a light metal and/or a light metal alloy, such as aluminum, magnesium, titanium, an aluminum alloy, a magnesium alloy, a titanium alloy or AlSiC, or contains or consists of another metal such as copper or CuSiC or a copper alloy, gold or gold alloys, silver or silver alloys, NiFe, an NiFe-casing having a copper core as well as a cobalt-iron alloy. The base body and also the housing can be constructed of light metal and/or a light metal alloy, for example aluminum or an aluminum alloy. All components of the storage device can be constructed of light metal and/or a light metal alloy, such as aluminum or an aluminum alloy.

The sealing glass is either part of the electrically insulating material through which the at least one conductor, such as the substantially pin-shaped conductor, is fed, or constitutes the electrically insulating material. In one layered structure of the electrically insulating material, the top and/or the bottom layer includes or consists of the sealing glass. One structure of the electrically insulating material provides that a multicomponent glass is provided that includes at least two glasses having adapted coefficients of expansion, on the one hand for the material of the base body and on the other hand for the material of the conductor, wherein the multicomponent glass is arranged between a top and a bottom layer, each of which include or consist of sealing glass.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
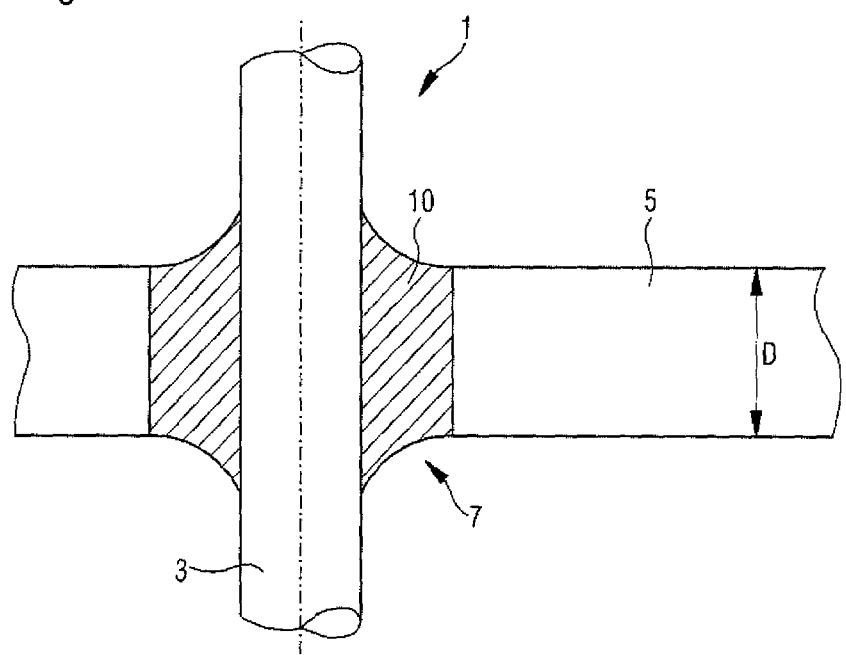
FIG. 1 is a schematic view of one embodiment of the feedthrough according to the current invention.

FIG. 1 illustrates a feedthrough 1 according to the invention. Feedthrough 1 includes as a conductor, in particular a pin-shaped conductor, a metal pin 3 that can consist of a light metal, for example aluminum and/or a light metal alloy, for example an aluminum alloy or another metal or another metal alloy such as copper or a copper alloy. It further includes as a base body 5 a metal component that can consist of a light metal, such as aluminum, magnesium, titanium and/or a light metal alloy, an aluminum alloy, a magnesium alloy or a titanium alloy, aluminum or an aluminum alloy. Metal pin 3 is fed through an opening 7 that passes through metal component 5. Even though only one single metal pin is shown as being fed through the opening, multiple metal pins could be fed through the opening without deviating from the invention.

The outer contour of opening 7 can be round, but also oval. Opening 7 reaches through the entire thickness D of base body or respectively metal component 5. Metal pin 1 is surrounded by a sealing glass 10 and is fed inside sealing glass 10 through opening 7 through base body 5. Opening 7 is introduced into base body 5 by, for example, a cutting process, such as punching. In order to provide a hermetic feedthrough of metal pin 3 through opening 7, metal pin 3 is sealed into a sealing glass plug 10 (glass pellet or solder glass ring) consisting of the sealing glass material. This provides a material bond between metal pin 3 and sealing glass plug 10 on the one hand and on the other hand between base body 5 and sealing glass plug 10. This prevents the metal pin 3 from being pushed out of opening 7, even under increased stresses upon sealing glass plug 10, for example compressive stresses. The processing temperature of the sealing glass with base body 5 can be in the range of 20 K to 100 K below the melting temperature of the material of base body 5 and/or the conductor, in particular pin-shaped conductor 3.

In the illustrated embodiment, sealing glass plug 10 consists of a single material—without restriction thereto—of a selected sealing glass composition in the embodiment of a titanate glass as specified. In the illustrated arrangement, the material of base body 5 and the conductor, in particular substantially pin-shaped conductor 3 can consist of the same material, such as aluminum or aluminum alloy.

A material bond is obtained between sealing glass 10 and components 3, 5 consisting of aluminum or aluminum alloy.

In FIG. 2, plug 10 is again illustrated in detail. In this embodiment, plug 10 comprises a layered structure, whereby a structure consisting of 3 layers is illustrated. Other embodiments having fewer or more layers are possible.

In the illustrated layered structure, outer layers 10.1 and 10.2 consist of the sealing glass in the embodiment of a titanate glass. The two layers 10.1 and 10.2 can, for example, consist of the same or of different sealing glass compositions. The outside layers hereby protect the layer(s) between them.

Inside layer 20 can be selected from a suitable material, such as a glass or glass ceramic material. According to one arrangement, center layer 20 is formed by a phosphate glass, such phosphate glass having already been described.

A pellet is therefore produced that comprises a total of three layers, wherein the outside layers (top and bottom layer) 10.1 and 10.2 are selected from the sealing glass according to the invention. The coefficients of expansion of the individual layers are selected accordingly.

Sealing glass layers 10.1 or 10.2 respectively have a thickness in the range of 1 to 10 mm, such as 4 to 9 mm or 5 to 7 mm and a diameter of up to 25 mm.

Figure 2:
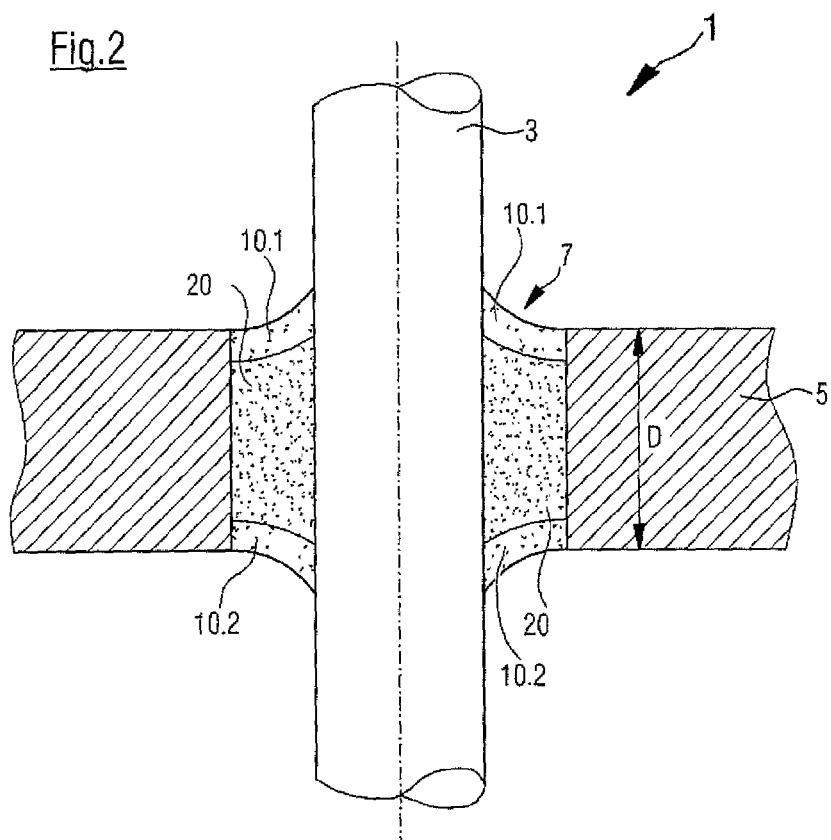
FIG. 2 is a schematic view of an additional embodiment of the feedthrough according to the current invention.

The layered structure illustrated in FIG. 2 represents a sandwich structure, wherein the outside layers 10.1 and 10.2 consisting of sealing glass according to the invention surround the inside structure of phosphate glass. The first outside (top) layer 10.1 (positioned in the drawing on top of the layer structure) serves as cover and protection for the energy producing device and/or energy storage device, such as a battery, toward the outside, in particular the environment, for example, against moisture penetration. The second outside (bottom) layer 10.2 (positioned in the drawing at the bottom of the layer structure) serves as cover and protection for the energy producing device and/or energy storage device, such as a battery, toward the inside, in particular against electrolytes contained in the battery. Other variations are conceivable. This embodiment provides a material bond between sealing glass and base body and metal pin.

Figure 3:
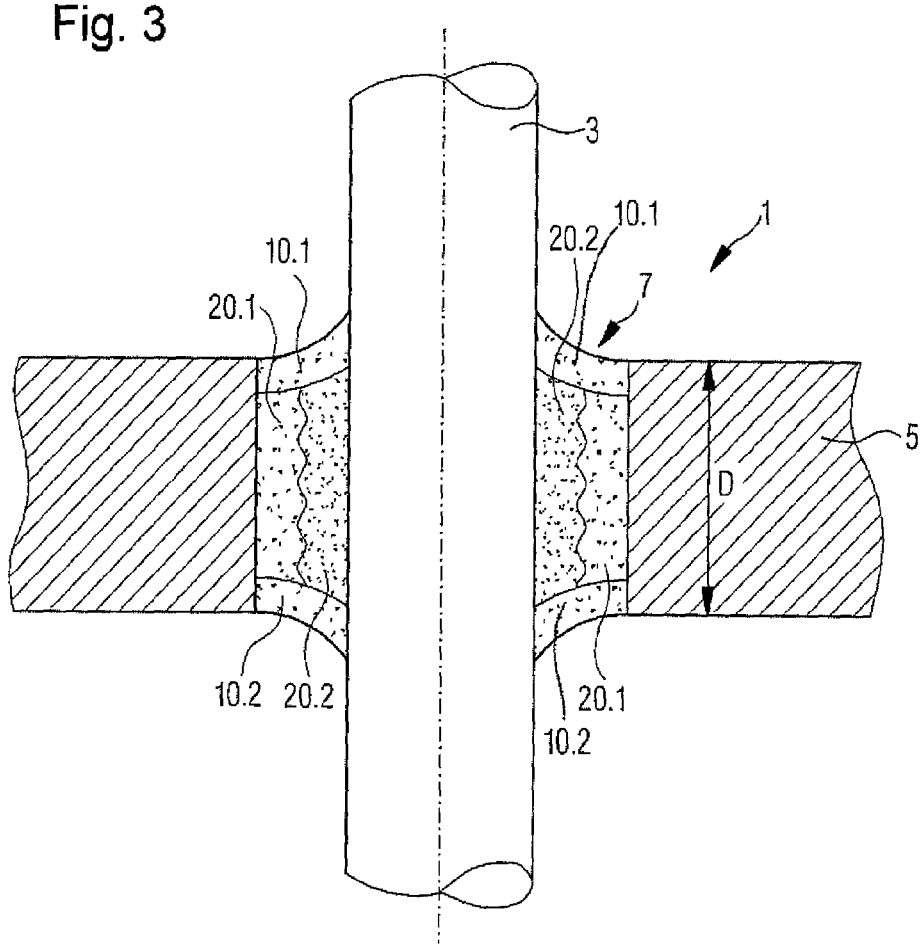
FIG. 3 is a schematic view of yet another embodiment of the feedthrough according to the current invention.

FIG. 3 illustrates an additional embodiment for a feedthrough 1 according to the invention. In the illustrated embodiment, feedthrough 1 includes a metal pin 3 as the pin-shaped conductor that consists, for example, of copper. Base body 5 in the illustrated example consists of a light metal, such as aluminum, magnesium and/or titanium and/or a light metal alloy, such as an aluminum alloy, titanium alloy and/or a magnesium alloy. The coefficient of expansion α (20° C.-300° C.) of the light metal is in the range of $18 \times 10^{-6}$ to $30 \times 10^{-6}$/K.

Metal pin 3 is fed through an opening 7 that passes through metal component 5. Multiple metal pins could be fed through the opening without deviating from the invention.

The outer contour of opening 7 can be round, but also oval. Opening 7 reaches through the entire thickness D of base body or respectively metal component 5. Metal pin 1 is embedded in an electrically insulating material consisting of glass or glass ceramic material and is fed inside the glass or glass ceramic material through an opening 7 through base body 5 which was produced, for example, in a cutting process. In order to provide a hermetic feedthrough of metal pin 3 through opening 7, metal pin 3 is sealed in a glass plug (glass pellet or solder glass ring) consisting of glass or glass ceramic material.

The glass plug in the illustrated embodiment consists—without restriction thereto—not of a single material, but of several materials; it is therefore a multicomponent glass.

Since coefficient of expansion $\alpha_{Cu}$ of metal pin 3 that, in the illustrated design, consists of copper is in the range of $16 \times 10^{-6}$ K$^{-1}$ at 20° C. and the coefficient of expansion $\alpha_{Al}$ of the base body or respectively metal component that, in the current example, consists of aluminum is in the range of $23 \times 10^{-6}$ K$^{-1}$ the glass plug, on its side facing toward the base body or respectively metal component 5 comprises a first glass material 20.1 whose coefficient of expansion $\alpha_1$ is in the range of the coefficient of expansion of metal part 5. In a case where metal component 5 is manufactured of aluminum, the coefficient of expansion $\alpha_1$ is therefore in the range of 16 to $25 \times 10^{-6}$ K$^{-1}$.

Second glass material 20.2 facing toward metal pin 3 has essentially the same coefficient of expansion $\alpha_2$ of metal pin 3. If metal pin 3 is a copper pin, then coefficient of expansion $\alpha_2$ of second glass material 20.2 is between 12 and $18 \times 10^{-6}$ K$^{-1}$.

In the illustrated embodiment, layers 10.1 and 10.2 are constructed from the inventively used sealing glass. Layer 10.1 may be in the form of a cover glass. In this embodiment the two layers 10.1 and 10.2 can consist of the same or different sealing glass compositions. These layers of sealing glasses according to the invention thereby protect the multicomponent glass that is positioned between them.

The first glass material for glass 20.1 can be selected from silicate-titanate, sulpho-phosphate, telluride, boride, vanadate, fluoride, phosphate or silicate, whereby the glasses can in addition include fillers for adjustment of the coefficient of expansion, for example alkali or earth alkali. For second glass 20.2 that is positioned adjacent to metal pin 3 silicate-titanate, sulpho-phosphate, telluride, boride, vanadate, fluoride, phosphate and silicate are also considered, whereby fillers can be provided for adjustment of the coefficient of expansion also in this case, as well as alkali or earth alkali. In the illustrated embodiment, the multicomponent glass therefore consists of two glasses having different coefficients of expansion $\alpha_1$, $\alpha_2$ which are protected by titanate glass layers 10.1 and 10.2. Other arrangements with more than 2 glasses are possible.

First outside layer 10.1 (positioned in the drawing on top) serves as cover and protection for the electrical energy producing device and/or energy storage device, in particular the battery, toward the exterior, in particular to the environment. Second outside layer 10.2 (positioned in the drawing at the bottom) serves as cover and protection for the energy producing device and/or energy storage device—in particular a battery—toward the inside, in particular the electrolyte contained in the battery. Other variations are conceivable.

The electrically insulating material therefore represents collectively a multicomponent glass consisting of the 2 glasses having respectively adapted coefficients of expansion which are surrounded by the top and the bottom layer consisting of inventive sealing glass.

With this embodiment a material bond of sealing glass and base body and metal pin is provided.

Design examples for the inventively used sealing glass compositions are given below and referenced with comparative examples.

Design Examples

Tables 1 and 2 below are examples of sealing glass compositions according to the current invention:

TABLE 1

| Composition | D1 | D2 | D3 | D4 | D5 | D6 | D7 | D8 | D9 | D10 |
|---|---|---|---|---|---|---|---|---|---|---|
| Weight % | | | | | | | | | | |
| $P_2O_5$ | 1.7 | 1.7 | 1.7 | 1.2 | 1.0 | 1.0 | 1.0 | 1.0 | 1.0 | 1.0 |
| CaO | | | | 0.1 | 0.1 | 0.1 | 0.1 | 0.1 | 0.1 | 0.1 |
| $Li_2O$ | | | | 1.0 | 1.0 | 1.0 | 1.0 | 1.0 | 1.0 | 0.9 |
| $Na_2O$ | 16.2 | 21.2 | 16.2 | 14.2 | 18.3 | 14.1 | 16..6 | 16.6 | 16.6 | 17.2 |
| $K_2O$ | 20.8 | 25.8 | 20.8 | 18.2 | 26.9 | 21.7 | 24.2 | 24.2 | 24.2 | 24.9 |
| $Al_2O_3$ | | | | 0.3 | 0.3 | 0.3 | 0.3 | 0.3 | 0.3 | 0.3 |
| $B_2O_3$ | | | | 0.2 | 0.2 | 0.2 | 0.2 | 0.2 | 0.2 | .2 |
| $SiO_2$ | 43.5 | 33.5 | 33.5 | 39.4 | 28.0 | 27.7 | 27.7 | 30.2 | 30.2 | 32.5 |
| $TiO_2$ | 17.8 | 17.8 | 17.8 | 14.3 | 13.6 | 13.5 | 13.4 | 13.4 | 13.4 | 5.5 |
| $Bi_2O_3$ | | | 10.0 | | 9.9 | 5.0 | 2.5 | 5.0 | 6.9 | |
| $V_2O_5$ | | | | 11.1 | 10.6 | 10.5 | 10.5 | 10.5 | 8 | 10.5 |
| Sum | 100 | 100 | 100 | 100 | 100 | 100 | 100 | 100 | 100 | 100 |
| Properties | | | | | | | | | | |
| α (*) | 17.7 | 22.7 | 19.7 | 17.2 | 24.0 | 21.3 | 23.2 | 22.7 | 23.2 | 24.5 |
| Tg (° C.) | 495 | 458 | 463 | 516 | 467 | 471 | 374 | 386 | 418 | 356 |

* RT-350° C. (×10 − 6 K − 1)

TABLE 2

| Glass Components | A1 Wt. % | A2 Wt. % | A3 Wt. % | A4 Wt. % | B1 Wt. % | B2 Wt. % | C1 Wt. % | C2 Wt. % | C3 Wt. % | D2 Wt. % | D5 Wt. % | D6 Wt. % | E1 Wt. % |
|---|---|---|---|---|---|---|---|---|---|---|---|---|---|
| $B_2O_3$ | 2.0 | 1.2 | 0.5 | 1.6 | 1.3 | 0.8 | 2.4 | 0.2 | 0.2 | 0 | 0.2 | 0.2 | 2 |
| $Li_2O_3$ | 1.7 | 2.4 | 2.2 | 1.5 | 2.7 | 2.3 | 2.4 | 1.3 | 1.0 | | 1.0 | 1.0 | 1 |
| $Al_2O_3$ | 0.6 | 1.2 | 0.9 | 1.1 | 0.6 | 0.5 | 0.4 | 1.2 | 0.3 | | 0.3 | 0.3 | 2 |
| $As_2O_3$ | | | | | | | | | | | | | |
| BaO | | | 0.3 | 3.3 | 4.0 | 0.7 | 9.5 | | | | | | |
| $Bi_2O_3$ | | | | | | | | | | | | 9.9 | 18 |
| CaO | 1.0 | 0.5 | 0.1 | | | | 0.1 | | 0.1 | | 0.1 | 0.1 | |
| Cl | | | | | | | | | | | | | |
| CuO | 5.7 | | | | | | | | | | | | |
| $Fe_2O_3$ | | | 3.2 | 3.9 | | | 0.1 | | | | | | |
| $K_2O$ | 11.0 | 11.0 | 12.0 | 13.0 | 11.0 | 12.0 | 12.0 | 12.0 | 18 | 25.8 | 26.9 | 21.7 | 12 |
| MgO | | | 0.0 | | | 0.1 | | | | | | | |
| $Na_2O$ | 17.0 | 16.0 | 17.0 | 15.0 | 16.0 | 16.0 | 13 | 16.0 | 14.0 | 21.2 | 18.3 | 14.1 | 20 |
| $Nb_2O_3$ | | | | | | | | | | | | | |
| $P_2O_5$ | 2.1 | 2.2 | 1.6 | 1.7 | 2.3 | 1.9 | 1.4 | 1.5 | 1.5 | 1.7 | 1.0 | 1.0 | |
| PbO | | | | | | | | | | | | | |
| $SO_3$ | | | | | | 0.1 | | | | | | | |
| $Sb_2O_3$ | | | | | 2.1 | 0.2 | 6.4 | | | | | | |
| $SiO_2$ | 30.6 | 32.4 | 33.5 | 32.6 | 33.8 | 34.2 | 24.9 | 33.4 | 29.9 | 33.5 | 28.0 | 27.7 | 26 |
| $SnO_2$ | | | | | 0.1 | 0.1 | 3.1 | | | | | | |
| SrO | | | | | 0.1 | 0.1 | 2.3 | | | | | | |
| $TiO_2$ | 23.0 | 23.0 | 26.0 | 26.0 | 18.0 | 22.0 | 22 | 25.0 | 24.0 | 17.8 | 13.6 | 13.5 | 12 |

TABLE 2-continued

| Glass Components | A1 Wt. % | A2 Wt. % | A3 Wt. % | A4 Wt. % | B1 Wt. % | B2 Wt. % | C1 Wt. % | C2 Wt. % | C3 Wt. % | D2 Wt. % | D5 Wt. % | D6 Wt. % | E1 Wt. % |
|---|---|---|---|---|---|---|---|---|---|---|---|---|---|
| $V_2O_5$ | 5.1 | 10.0 | 2.2 | | 7.7 | 8.8 | | 9.2 | 11.0 | | 10.6 | 10.5 | 6 |
| ZnO | 0.1 | 0.1 | | | | | | 0.1 | | | | | |
| $ZrO_2$ | 0.1 | | 0.5 | 0.3 | 0.3 | 0.2 | | 0.1 | | | | | 1 |
| Sum | 100 | 100 | 100 | 100 | 100 | 100 | 100 | 100 | 100 | 100 | 100 | 100 | 100 |

The stability of some of the sealing glass compositions specified in table 2 was evaluated by way of the weight loss due to so-called leaching that was previously described. The results are compiled in table 3.

TABLE 3

Stability test in LP30 (60° C./168 h)

| | Sealing glass A1 | Sealing glass C1 | Sealing glass B1 |
|---|---|---|---|
| Leaching weight loss (Weight %) | 9.5 | 1.2 | 10.8 |

The composition of LP30 was as follows:

| $LiPF_6$: | 11.8 weight-% |
| EC (ethylene carbonate) | 44.1 weight-% |
| DC (dimethyl carbonate) | 44.1 weight-% |

The results prove that the sealing glass composition A1, C1 and B1 selected according to the invention are superior to the current state of the art; in other words, they are more stable in the LP30 electrolyte.

TABLE 4

Transformation temperatures and thermal expansion
(measured with an optical dilatometer)

| | A1 | A2 | A3 | A4 | B1 | B2 | C1 | C2 | C3 | D2 | D5 | D6 | D10 | E1 |
|---|---|---|---|---|---|---|---|---|---|---|---|---|---|---|
| Tg [° C.] | 367 | 380 | 398 | 391 | 375 | 391 | 375 | 408 | 359 | 458 | 467 | 470 | 356 | 359 |
| α* | 17.8 | 18.7 | 17.9 | 16.5 | 18.8 | 18.9 | 16.6 | 18 | 21.2 | n.b. | n.b. | n.b. | n.b. | 21.2 |
| α** | 16.2 | 16.9 | 16.3 | 15.9 | 17 | 16.7 | 14.8 | 15.8 | 19.1 | n.b. | n.b. | n.b. | n.b. | |
| α*** | n.b. | n.b. | n.b. | n.b. | n.b. | n.b. | n.b. | n.b. | n.b. | 22.7 | 24.0 | 21.3 | 24.5 | |

*α for T-range: RT-TG ($\times 10^{-6}$ $K^{-1}$)
**α for T-range: RT-300° C. ($\times 10^{-6}$ $K^{-1}$)
***α for T-range: RT-350 ≥ C. ($\times 10^{-6}$ $K^{-1}$)

The transformation temperatures Tg for the sealing glass compositions in Table 2 are specified in Table 4. Transformation temperature Tg is defined, for example, in "Schott Guide to Glass, second edition, 19966, Chapman 7 Hall, pages 18-21. The coefficient of expansion α is specified in $10^{-6} K^{-1}$ in temperature range 20° C. to a particular Tg and up to 300° C.

All specified glass compositions have a relatively low Tg and a relatively high coefficient of expansion α.

This substantiates the particular suitability of the inventive sealing glasses in conjunction with light metals and/or light metal alloys. According to the invention, the sealing glasses are well suited for aluminum or aluminum alloys—this means an aluminum pin as the conductor in a surrounding aluminum base body—whereby the aluminum even in the case of the conductor and/or base body can be replaced by an aluminum alloy. Sealing glass compositions C3 and D10 are characterized in that they have a very high thermal expansion—$24.5 \times 10^{-6} K^{-1}$ for temperatures between 20° C. and 300° C.—and are thus in the range of thermal expansion of light metals such as aluminum. At room temperature, aluminum has a thermal expansion of $\alpha = 23 \times 10^{-6}/K$. In order to prevent that during sealing the light metal/the light metal alloy of the base body and possibly also of the metal pin melts or is deformed, the melting temperature of the glass material is below the melting temperature of the base body and/or the conductor. At the same time, these glass compositions (C3 and D10) have the lowest Tg. This assists with the fabrication, since low temperatures can be used for fabrication. The sealing temperature of the specified sealing glass composition is then in the range of 250° C. to 650° C. Sealing of the substantially pin-shaped conductor and the base body can be achieved after insertion of the feedthrough into the opening in that a premanufactured formed body consisting of sealing glass or a multicomponent glass comprising sealing glass, together with the conductor, in particular the pin-shaped conductor and the base body is subjected to a heat treatment. This results in a material bond between the sealing glass and the base body and/or the conductor.

The current invention thus specifies for the first time a feedthrough for a housing, such as a battery cell housing for a lithium-ion battery which, when using sealing glass, is suitable for being inserted into housing components of battery cell housings, consisting of a light metal, such as aluminum, magnesium and/or titanium, and/or a light metal alloy such as an aluminum alloy, a magnesium alloy and/or a titanium alloy.

With the feedthrough according to the invention, a battery housing can be provided that is hermetically sealed even when the battery housing is deformed under mechanical/and or thermal stress, in contrast to plastic feedthroughs that have a tendency to crack. The sealing glasses that are used in the feedthroughs according to the invention are chemically stable, in particular with regard to Li- and F-containing electrolytes. For batteries with battery housings having a feedthrough according to the current invention, especially high continuous temperature resistance is herewith provided in normal operating conditions, but also in vehicle accidents and/or during malfunction. This is particularly significant in the use of batteries, such as lithium-ion batteries in the automotive sector or in aircraft.

The solution according to the invention makes it possible—in particular also based on a reduction of the phosphate component—to revert to a cost-effective production method and base materials. Moreover, the entire feedthrough may be formed as a pre-manufactured component wherein the metal pin can be sealed by way of a fixing material, for example a sealing glass plug into a base body, before same is inserted into the housing component.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electric energy production device or an electric energy storage device, comprising a housing and a feed-through wherein the feed-through comprises:
   at least one base body, wherein the base body has at least one opening, said base body one of including and consisting of at least one of a light metal and a light metal alloy;
   at least one conductor in an electrically insulating material fed through said at least one opening, said electrically insulating material having a layer structure of at least two layers wherein a top layer being arranged towards the outside of the electric energy production device or the electric energy storage device consists of a sealing glass and an inner layer one of comprises and consists of a further glass material or glass ceramic material, wherein said electrically insulating material being bonded with at least one of said base body and said conductor, wherein said sealing glass one of includes and consists of titanium glass, and wherein said sealing glass is a titanate glass one of including and consisting of the following components in weight-% on an oxide basis:

| | |
|---|---|
| $B_2O_3$ | 0-<3; |
| $Li_2O$ | 0-3; |
| $Al_2O_3$ | 0-2; |
| BaO | 0-<11; |
| CaO | 0-1; |
| CuO | 0-<7; |
| $Fe_2O_3$ | 0-<5; |
| $K_2O$ | 10-27; |
| MgO | 0-<0.5; |
| $Na_2O$ | 12-22; |
| $Nb_2O_3$ | 0-0.5; |
| $P_2O_5$ | 0-3; |
| PbO | 0-<0.5; |
| $SO_3$ | 0-0.5; |
| $Sb_2O_3$ | 0-<7; |
| $SiO_2$ | 24-44; |
| $SnO_2$ | 0-<4; |
| SrO | 0-<2; |
| $TiO_2$ | 5-28; |
| $V_2O_5$ | 0-13; |
| ZnO | 0-<0.5; |
| $ZrO_2$ | 0-1; and |
| $Bi_2O_3$ | 0-19. |

2. The electric energy production device or electric energy storage device according to claim 1, wherein the layer structure comprises three layers in the form of a sandwich structure, wherein the top layer and a bottom layer consists of the sealing glass.

3. The electric energy production device or electric energy storage device according to claim 1 or claim 2, wherein the inner layer one of includes or consists of a phosphate glass.

4. The electric energy production device or electric energy storage device according to claim 3, wherein said phosphate glass one of includes and consists of the following components in mol-%:

| | |
|---|---|
| $P_2O_5$ | 35-50 mol-%; |
| $Al_2O_3$ | 0-14 mol-%; |
| $B_2O_3$ | 2-10 mol-%; |
| $Na_2O$ | 0-30 mol-%; |
| $M_2O$ | 0-20 mol-%, whereby M is one of K, Cs, and Rb; |
| PbO | 0-10 mol-%; |
| $Li_2O$ | 0-45 mol-%; |
| BaO | 0-20 mol-%; and |
| $Bi_2O_3$ | 0-10 mol-%. |

5. The electric energy production device or electric energy storage device according to claim 1, wherein the electric energy production device or the electric energy storage device is at least one of a battery, a lithium-ion battery, a lithium-ion accumulator and a capacitor.

6. The electric energy production device or electric energy storage device according to claim 1, wherein said conductor is a substantially pin-shaped conductor.

7. The electric energy production device or electric energy storage device according to claim 1, wherein said light metal is one of aluminum, magnesium, and titanium, and said light metal alloy is one of an aluminum alloy, a magnesium alloy, a titanium alloy, and AlSiC.

8. The electric energy production device or electric energy storage device according to claim 6, wherein said substantially pin-shaped conductor one of includes and consists of a light metal, a light metal alloy, aluminum, an aluminum alloy, copper, CuSiC, a copper alloy, gold, a gold alloy, silver, a silver alloy, NiFe, an NiFe-casing having a copper core, and a cobalt-iron alloy.

9. The electric energy production device or electric energy storage device according to claim 1, wherein the housing one of includes and consists of at least one of a light metal and a light metal alloy.

10. The electric energy production device or electric energy storage device according to claim 1, wherein said titanate glass includes at least one of the following components in weight-% on an oxide basis:

| | |
|---|---|
| $Al_2O_3$ | 0-<2; |
| SrO | 0-1.9; |
| $V_2O_5$ | >5-13; and |
| $Bi_2O_3$ | 0-18. |

11. The electric energy production device or electric energy storage device according to claim 1, wherein said titanate glass one of includes and consists of the following components in weight-% on an oxide basis:

| | |
|---|---|
| $B_2O_3$ | 0-<3; |
| $Li_2O$ | 1-3; |
| $Al_2O_3$ | 0-<2; |
| BaO | 0-4; |
| CaO | 0-1; |
| CuO | 0-<6; |
| $Fe_2O_3$ | 0-<0.5; |
| $K_2O$ | 10-20; |
| MgO | 0-<0.5; |
| $Na_2O$ | 12-20; |
| $Nb_2O_3$ | 0-<0.5; |
| $P_2O_5$ | 1-3; |
| PbO | 0-<0.5; |
| $SO_3$ | 0-<0.5; |
| $Sb_2O_3$ | 0-<0.5; |
| $SiO_2$ | 28-37; |
| $SnO_2$ | 0-<0.5; |
| SrO | 0-<0.5; |
| $TiO_2$ | 13-28; |
| $V_2O_5$ | >5-10; |
| ZnO | 0-<0.5; |
| $ZrO_2$ | 0-<0.5; and |
| $Bi_2O_3$ | 0-18. |

12. The electric energy production device or electric energy storage device according to claim 1, further comprising a bottom layer which includes the titanate glass, wherein said electrically insulating material includes at least two glass or glass ceramic materials including a first glass or glass ceramic material having a first coefficient of expansion and a second glass or glass ceramic material having a second coefficient of expansion, said first coefficient of expansion and said second coefficient of expansion being different from each other, wherein said first glass or glass ceramic material is selected so that said first coefficient of expansion is adapted to a coefficient of expansion of the material of said base body, wherein said second glass or glass ceramic material is selected so that said second coefficient of expansion is adapted to a coefficient of expansion of the material of said conductor.

13. The electric energy production device or electric energy storage device according to claim 12, wherein said first coefficient of expansion of said first glass or glass ceramic material is in a range of 16 to $25 \times 10^{-6} K^{-1}$ in the temperature range of 20° C. to 300° C., wherein said first glass or glass ceramic material is at least one of the following glass materials: a silicate-titanate, a sulpho-phosphate, a telluride, a boride, a vanadate, a fluoride, a phosphate, a silicate, an alkali, an earth alkali, any of the aforementioned materials including a filler for expansion adaptation, an Fe doping agent, a Cr doping agent, a Co doping agent, and a V doping agent.

14. The electric energy production device or electric energy storage device according to claim 13, wherein said second coefficient of expansion of said second glass or glass ceramic material is in the range of 12 to $18 \times 10^{-6} K^{-1}$ in the temperature range of 20° C. to 300° C.

15. The electric energy production device or electric energy storage device according to claim 13, wherein said electrically insulating material includes the first glass or glass ceramic material and the second glass or glass ceramic material and the top layer and the bottom layer, said electrically insulating material being at least one of a multicomponent glass and a glass pellet.

16. The electric energy production device or electric energy storage device according to claim 1, wherein said sealing glass has a coefficient of expansion in a range of $17 \cdot 10^{-6}/K$ to $25 \cdot 10^{-6}/K$ in the temperature range of 20° C. to 300° C. and a transformation temperature Tg in the range of 300 to 500° C.

17. The electric energy production device or electric energy storage device according to claim 1, wherein at least one of said light metal and said light metal alloy is at least one of pre-treated and coated prior to creating said material bond.

18. The electric energy production device or electric energy storage device according to claim 17, wherein at least one of said light metal and said light metal alloy is at least one of degreased, stripped of a surface-adhering oxide layer, chromate treated, phosphated, coated with silicate, coated with titanium oxide, and coated with zirconium oxide prior to creating said material bond.

* * * * *